B. L. OLDS.
Horse-Power Links.

No. 164,473.            Patented June 15, 1875.

WITNESSES:
E. Wolff
N. F. Terry

INVENTOR:
B. L. Olds
BY
ATTORNEYS.

UNITED STATES PATENT OFFICE.

BARNARD L. OLDS, OF HIGHGATE, VERMONT.

IMPROVEMENT IN HORSE-POWER LINKS.

Specification forming part of Letters Patent No. 164,473, dated June 15, 1875; application filed May 1, 1875.

*To all whom it may concern:*

Be it known that I, BARNARD L. OLDS, of Highgate, in the county of Franklin and State of Vermont, have invented a new and useful Improvement in the Manufacture of Horse-Power Links, of which the following is a specification:

Many portable horse-powers for thrashing grain and other purposes consist of an endless chain revolving over pulleys composed of tread-pieces of wood united together by metallic links, which links are connected by rods, and have cogs on one side, which mesh into pinions, to produce the rotary motion required. These links are made in a variety of ways of wrought as well as cast iron.

The present invention consists in forming the links of a combination of the two, in the manner hereinafter described.

Figure 1:
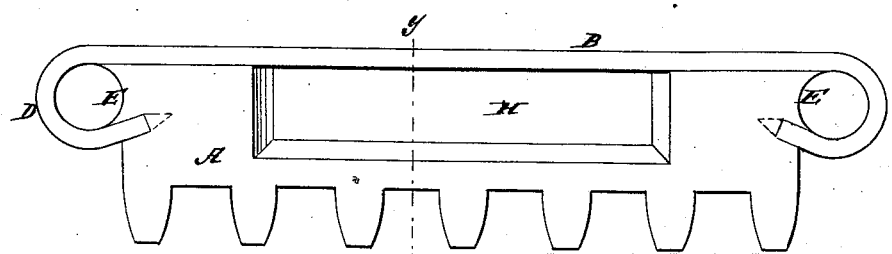
Figure 2:
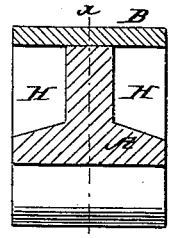
Figure 3:
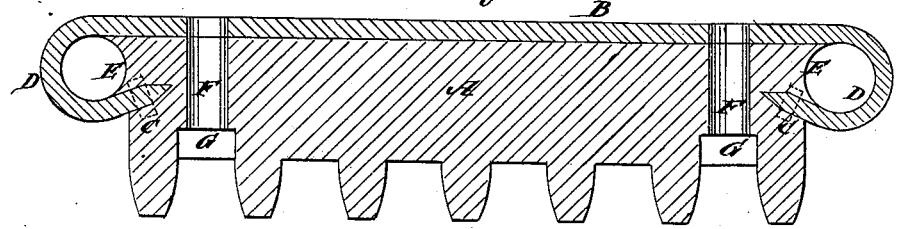
Figure 4:
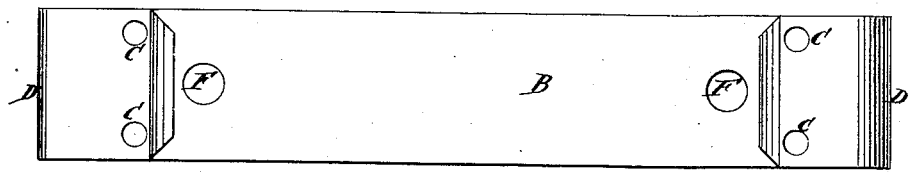

In the drawing, Figure 1 is a side view. Fig. 2 is a cross-section of Fig. 1, taken on the line x x. Fig. 3 is a longitudinal section taken on line y y of Fig. 2. Fig. 4 is a side view of the wrought part of the link detached.

Similar letters of reference indicate corresponding parts.

A is the cast-iron part, and B is the wrought-iron part or back, of the link. This part B is formed in proper shape, and is set in the mold, and is cast fast to the part A. The part B is made of band iron or steel of suitable width and thickness, and in the ends pins C are placed, and the ends are curved to circles D D for the attaching-rods. The circles D D are continued and made entire by making the ends of the casting circular, as seen at E E. With the pins C in the ends of the wrought-iron (cast in the metal) the circular bearing is rendered strong and durable. F F are bolt-holes, by means of which the link is attached to the wooden tread-pieces. These holes may be cast in the part A, and drilled through the part B, with recesses G cast in the part A for the heads of the bolts. H H are recesses in the sides of the link, which have no particular function except to make the link lighter in weight than it would otherwise be.

By this construction the link is made stronger than when made of entire cast-iron, and at much less cost than when it is made entirely of wrought-iron; besides, the drilling of the holes D D is avoided, and the requisite strength is secured without a useless weight of cast-iron around those holes.

Having thus described my invention, I claim as new and desire to secure by Letters Patent—

The horse-power link composed of the cast-iron body and wrought-iron back, the latter terminating at each end in a curve, forming a bearing for a journal within it, as shown and described.

BARNARD L. OLDS.

Witnesses:
JOHN A. FITCH,
ASA WHITCOMB.